United States Patent [19]
Latimer

[11] 3,958,036
[45] May 18, 1976

[54] STABLE AVOCADO BASE PREPARATION

[75] Inventor: Floyd E. Latimer, Inglewood, Calif.

[73] Assignee: Cav-Pro, Inc., Los Angeles, Calif.

[22] Filed: Feb. 25, 1972

[21] Appl. No.: 229,579

Related U.S. Application Data

[63] Continuation-in-part of Ser. No. 59,760, July 30, 1970, abandoned.

[52] U.S. Cl. ............................. 426/628; 426/640; 426/456; 426/464; 426/471; 426/473; 426/519; 426/524

[51] Int. Cl.² ........................................ A23L 1/00

[58] Field of Search ............. 99/100, 101, 103, 140, 99/144, 193, 204; 426/628, 615, 640, 464, 471, 473, 579, 524, 444, 456

[56] References Cited
UNITED STATES PATENTS

| | | | |
|---|---|---|---|
| 2,844,469 | 7/1958 | Melnick | 99/144 |
| 3,355,298 | 11/1967 | Loter | 99/144 |
| 3,397,994 | 8/1968 | Elenbogen | 99/144 |
| 3,397,995 | 8/1968 | Elenbogen | 99/144 |
| 3,437,494 | 4/1969 | Loter | 99/144 |
| 3,567,469 | 3/1971 | Pedroza | 99/204 |

OTHER PUBLICATIONS

Journal of the Rio Grande Valley Horticultural Society, Vol. XI, "Prep. of Frozen Avocado Mix. for Guacamole", 1957, p. 83.
Complete Book of Mexican Cooking, pp. 92 & 93, Lambert, 1967.

*Primary Examiner*—Norman Yudkoff
*Assistant Examiner*—Martin G. Mullen

[57] ABSTRACT

Avocado flesh, water, and vegetable gums are thoroughly and intimately admixed to produce a fine dispersion which is stable when stored for long periods of time either by itself or in admixture with mayonnaise or other foodstuffs. The fine dispersion is produced by passing the avocado flesh, water, and vegetable gums through a colloid mill, an emulsifier, or an homogenizer.

11 Claims, No Drawings

STABLE AVOCADO BASE PREPARATION

The present application is a continuation-in-part of copending application Ser. No. 059,760, filed July 30, 1970, now abandoned.

This invention relates to the preparation of a stable avocado base. More particularly this invention relates to a stable avocado base which is a fine dispersion.

Many tons of avocado culls are produced each year which are not suitable for sale as whole fresh avocados because they are of the wrong size, the wrong shape, or are not perfectly formed in some respect. The flesh from these avocados is the same as that of the other avocados. Because of their appearance, the problem of finding suitable outlets for these avocados has been of serious concern to the avocado growing and processing industries for many years. Previous attempts to convert these avocados into a dip or a spread which could be sold to the general public, for example, in the delicatessen section of a grocery store, have generally failed because upon standing the water separated out of the previous dips and spreads. The appearance of the product after separation has occurred is such that it generally cannot be sold.

According to the present invention, a stable avocado base is prepared which remains stable for extended periods of time under those conditions of storage and transportation which are required for products which are widely distributed and sold in retail grocery stores. The avocado base is stable both by itself and when admixed with other ingredients, such as mayonnaise, spices, vegetable flakes, starches and the like.

In practicing the present invention, the avocado flesh, water, vegetable gums, and other ingredients, if desired, are thoroughly and intimately admixed so as to produce a fine dispersion which is stable and from which water does not separate under conditions of storage and transportation for extended periods of time.

The intimate and thorough admixing of the avocado flesh, water, and vegetable gums is accomplished in equipment which is designed to produce fine uniform dispersions, such as, for example, homogenizers, colloidal mills, and emulsifiers.

The avocado flesh varies somewhat in its properties depending upon the variety, the climate, the soil, and the specific growing conditions under which that avocado was grown. For these reasons it is not possible to predefine exactly the conditions which will in each instance produce a fine dispersion of optimum stability. In general, when the admixing is accomplished in an homogenizer, the pressure should be at least about 500 pounds per square inch to produce the stable fine dispersion. Pressure in excess of about 2000 pounds per square inch may be employed if desired, however, no substantial benefits are obtained by using such pressures. When a colloid mill is used, the setting should be from about 0.001 to 0.050 inch to produce a fine stable dispersion. In general it is not possible to produce a dispersion which is fine enough to be stable under conditions of storage without using special mixing equipment which is capable of producing a fine dispersion, such as that produced by an homogenizer at a pressure of at least about 500 pounds per square inch.

The skins of the avocado may be incorporated with the avocado flesh to replace a portion of the vegetable gums. When used, the skins are cleaned, heated, ground and then intimately admixed with the avocado flesh before it is dispersed.

The vegetable gums, which may be used according to the present invention, include, for example, gum tragacathin, carragheen, guar, gum arabic, locust bean, alginates, starches, pectin and the like.

Water is added to the avocado to facilitate its dispersion and may be used in quantities of from about 10 percent to 80 percent by weight of the admixture, and preferably from about 35 percent to 65 percent by weight of the admixture. The vegetable gums may be used in an effective amount ranging from about 0.25 percent to 2 percent by weight of the total admixture and preferably from about 0.5 percent to 1 percent by weight of the total admixture.

The stabilized avocado base remains stable under many different conditions. The stable avocado base, for example, may be frozen and thawed, and the thawed product will remain stable. Likewise, the stable avocado base may be dried by freeze or spray drying techniques, and when admixed with water, it will again be stable. The avocado base may be admixed with other ingredients, for example, mayonnaise, vegetable flakes, sour cream, and the like. The resultant admixture will be stable under conditions of storage and transportation. The admixtures prepared according to this invention are stable for long periods of time, but in general they are stable for at least about one month and preferably for periods of at least about three months.

Other ingredients besides avocado flesh, water and vegetable gums may be added and taken through the intimate admixing step. Other common ingredients include, for example, salt, vegetable flakes, spices, coloring agents, flavor additives, lemon juice to stabilize the color of the avocado and the like.

The avocado flesh, water, and vegetable gums may be premixed under conditions which are less rigorous than those of the intimate admixing so as to provide a premix. The premix may be frozen for storage and transportation purposes, if desired. The premix is then thawed and subjected to the intimate admixing step to produce a fine uniform dispersion. The characteristics of the fine dispersion are substantially unaffected by the freezing and thawing cycle of the premix. The ability to utilize previously frozen avocado flesh in the practice of this invention makes this invention amenable to a year round practice. If it were not possible to utilize previously frozen and thawed avocado flesh, then the process could only be practiced during or shortly after the avocado harvesting season when fresh avocados are available.

The following example is given by way of illustration and not limitation. All parts and percentages are by weight unless otherwise indicated.

EXAMPLE

This example is illustrative of the production of a stable avocado admixture.

The composition of the avocado material used in each run of this example is as follows:

Run 1 - A mixture of 40 weight percent avocado pulp, 55 weight percent water, 4.5 weight percent of an admixture of lemon juice, salt, ascorbic acid, onion, garlic, pepper, chili powder and vegetable flakes, and 0.5 weight percent vegetable gum.

Run 2 - The composition is the same as in Run 1.

Run 3 - The composition is the same as in Run 1 with the addition of 0.4 weight percent vegetable gum.

Run 4 - The composition is the same as in Run 3.
Run 5 - The composition is the same as in Run 3.
Run 6 - The composition is the same as in Run 3.
Run 7 - The composition is the same as in Run 3.
Separate portions of the avocado material are given various treatments to produce dispersions of varying characteristics. The conditions and results are recorded in the following table. The avocado material of Run No. 1 is not treated in any way to reduce the particle size of the fat globules before it is examined microscopically.

The particle size of the fat globules in each run is determined by diluting one part by weight of the dispersed product with 99 parts by weight of water. The dilutions are then examined under a microscope with a field 150 microns in diameter. The number of particles found in this field for each run is recorded in the table below.

The depth of penetration of a predetermined weight into the dispersed product in a measured period of time is determined. This is an indication of the stability and viscosity of the product. The weight used weighs ⅝ of an ounce and consists of a right circular conical head having a 45° angle and a diameter at the base of ¾ inch, and a ¼ inch diameter straight shaft of said cone for 4 3/16 inches. The weight is symmetrical about any plane including the axis of the cone. The point of the cone is brought to rest on the surface of the sample, and it is allowed to settle point first under the urging of gravity into the sample. The times and depths of penetration are recorded. In Run Nos. 5, 6, and 7 the weight penetrates to the indicated depth in the indicated time and then stops. All of the penetration tests are conducted at 40°F.

The sizes of the fat globules in Runs 4, 5, and 6 tend to be very uniform. In these runs less than 10 percent of the total number of globules differ in their diameters by more than about 10 microns. In Run No. 7 the globules are clustered so that an accurate determination of their size and number is difficult to make. The globules of Run No. 3 are not as uniform as those in Runs 4, 5, and 6.

The product of Run No. 1 is not acceptable for sale because water separates out of it immediately upon standing. The product of Run No. 2 is not acceptable for sale because water soon separates out of it upon standing. The product of Run No. 3 is acceptable for sale where it will not be required to stand for more than 30 days. This product tends to separate after about 30 days.

TABLE

| | RUN NUMBER | | | | | | |
|---|---|---|---|---|---|---|---|
| | 1 | 2 | 3 | 4 | 5 | 6 | 7 |
| Treatment of avocado material | None | Case Emulsifier | Colloid Mill set at 0.030 inch | Homogenizer, 750 pounds per square inch | Homogenizer, 1500 pounds per square inch | Homogenizer, 2000 pounds per square inch | Homogenizer, 2500 pounds per square inch |
| Consistency at end of run | Liquid, water separation | Thick, slight water separation | Thick, no water separation | Heavy, heavier than No. 3 | Heavy, heavier than No. 4 | Very heavy | Very heavy |
| Micron size of fat globules | | | | | | | |
| 30 & under | 3 | 15 | 0 | 0 | 0 | 0 | 0 |
| 25 & under | — | — | 0 | 0 | 1.2% | 0 | 0 |
| 20 & under | 50% | 10 | 0 | 0 | 0.6% | 1% | 1% |
| 15 & under | — | — | 1% | 2.5% | 0.6% | 5% | 7% |
| 10 & under | 49% | 99% | 8% | 7.5% | 7.5% | 16% | 22% |
| Under 5 | — | — | 91% | 90% | 90% | 78% | 70% |
| Weight Penetration in inches | 5 | 4.5 | 4.25 | 5 | 1 Stopped | 0.5 Stopped | 0.5 Stopped |
| Time in seconds | 2 | 120 | 120 | 60 | 120 | 120 | 120 |
| Viscosity, centipoises | — | — | 6,250 | 8,000 | 9,500 | 10,000 | 11,500 |

The product should have fat globules of a substantially uniform size, that is, at least about 80 percent of the globules should not differ in diameter from one another by more than about 10 microns. At least about 90 percent of the fat globules should have diameters of less than about 10 microns. At least about 70 percent of the fat globules should have diameters of less than about 5 microns. The ⅝ ounce weight should take at least about ½ minute to penetrate 5 inches into the fine dispersion of avocado at 40°F. Preferably, at least 90 percent of the fat globules will have diameters which do not differ by more than 10 microns from the average globule size; the ⅝ ounce weight should take at least one minute to penetrate 5 inches into the fine dispersion; and at least 95 percent of the globules should have diameters of less than about 10 microns. The viscosity of the fine dispersion of avocado should range from about 5,500 centipoises to 15,000 centipoises and preferably is at least about 6,000 centipoises.

The fine dispersion of avocado will preferably contain substantially no globules having diameters larger than 25 microns.

The blending of the avocado product should be sufficient to produce a fine dispersion in which none of the fat globules have diameters in excess of 30 microns.

What is claimed is:

1. A process of preparing a stable avocado admixture comprising:
    adding avocado flesh, water, and vegetable gums together to produce an admixture; and
    homogenizing said admixture until a fine dispersion is produced in which at least about 90 percent of the fat globules have diameters of less than about 10 microns, at least about 80 percent of the fat globules do not differ in diameter from one another by more than about 10 microns, the viscosity of said fine dispersion being at least about 5,500 centipoises, and said fine dispersion being stable for a period of at least about one month.

2. A process of claim 1 wherein the homogenizing is accomplished in an homogenizer at a pressure of at least about 500 pounds per square inch.

3. A process of claim 1 wherein the homogenizing is accomplished in a colloid mill at a mill setting of from about 0.001 to 0.050 inch.

4. A process of claim 1 wherein at least the avocado meat is frozen and thawed before the homogenizing is accomplished.

5. A process of claim 1 wherein the fine dispersion is dried.

6. A process of claim 1 wherein the fine dispersion is frozen.

7. A process of preparing a stable avocado admixture comprising:
  adding avocado flesh, water, and vegetable gums together to produce an admixture; and
  thoroughly and intimately mixing said admixture until a fine stable dispersion is produced in which at least about 70 percent of the fat globules have a diameter of less than about 5 microns and in which substantially none of the fat globules have a diameter greater than about 25 microns.

8. A process of claim 7 including thoroughly and intimately mixing said admixture until a fine stable dispersion is produced which is substantially like that produced by homogenizing said ingredients in an homogenizer at a pressure of at least about 500 pounds per square inch.

9. A process of preparing a stable avocado admixture comprising:
  adding avocado flesh, from about 10 to 80 weight percent water, and from about 0.25 to 2 weight percent vegetable gums together to produce an admixture; and
  thoroughly and intimately mixing the admixture until a fine dispersion is produced in which at least about 90 percent of the fat globules are of a substantially uniform size that does not differ by more than 10 microns from the average globule size, which size is less than about 10 microns.

10. A process of preparing a stable avocado admixture comprising the steps of:
  adding avocado flesh, from about 10 to 80 weight percent water, and from about 0.25 to 2 weight percent vegetable gums together to produce an admixture; and
  thoroughly and intimately mixing said admixture until a fine dispersion is produced from which dispersion said water does not separate upon standing for a period of at least about 30 days.

11. A process of preparing a stable avocado admixture comprising the steps of:
  adding avocado flesh, from about 10 to 80 weight percent water, and vegetable gums together to produce an admixture; and
  thoroughly and intimately mixing said admixture until a fine dispersion is produced from which dispersion said water does not separate upon standing for a period of at least about one month and into which dispersion a weight weighing three-eighths of an ounce and having a right circular conical head having a 45 degree angle and a diameter at the base of three-quarter inch requires at least about one-half minute to penetrate 5 inches when the point of the cone is brought to rest on the surface of the said dispersion and is allowed to settle point first under the urging of gravity into said dispersion.

* * * * *